(12) United States Patent
Hefter

(10) Patent No.: US 7,092,699 B1
(45) Date of Patent: Aug. 15, 2006

(54) SEAMLESS WIRELESS PHONE ACCESS SERVICE

(75) Inventor: Jesse Hefter, Brookline, MA (US)

(73) Assignee: Verizon Laboratories Inc., Waltham, MA (US)

( * ) Notice: Subject to any disclaimer, the term of this patent is extended or adjusted under 35 U.S.C. 154(b) by 642 days.

(21) Appl. No.: 09/833,151

(22) Filed: Apr. 11, 2001

(51) Int. Cl.
*H04Q 7/20* (2006.01)
*H04Q 7/38* (2006.01)

(52) U.S. Cl. .............. 455/414.1; 455/412.1; 455/550.1; 455/414.3; 455/422.1; 455/403; 455/556.1; 455/418; 707/1; 707/201; 707/203; 707/204; 709/248; 709/203; 340/825.2; 340/825.21

(58) Field of Classification Search ......... 455/414.1, 455/403, 412.1, 422.1, 426.1, 500, 502, 517, 455/550.1, 556.1, 556.2, 557, 412.2, 414.3, 455/445, 458, 418, 419, 420, 413, 426.2, 455/509, 503, 575.1; 707/1, 201, 202, 203; 709/204, 248, 203; 340/825.2, 825.21
See application file for complete search history.

(56) References Cited

U.S. PATENT DOCUMENTS

| | | | |
|---|---|---|---|
| 5,793,762 | A | 8/1998 | Penners et al. |
| 6,034,621 | A | 3/2000 | Kaufman |
| 6,091,959 | A | 7/2000 | Souissi et al. |
| 6,138,245 | A | 10/2000 | Son et al. |
| 6,178,183 | B1 | 1/2001 | Buskirk, Jr. |
| 6,643,669 | B1 * | 11/2003 | Novak et al. ........... 707/201 |
| 6,721,787 | B1 * | 4/2004 | Hiscock ................ 709/217 |
| 6,810,405 | B1 * | 10/2004 | LaRue et al. ........... 707/201 |
| 6,820,204 | B1 * | 11/2004 | Desai et al. ........... 713/201 |
| 2001/0044321 | A1 * | 11/2001 | Ausems et al. ......... 455/556 |
| 2002/0111156 | A1 * | 8/2002 | Roeder ................ 455/417 |
| 2003/0023759 | A1 * | 1/2003 | Littleton et al. ....... 709/248 |
| 2004/0082320 | A1 * | 4/2004 | Cox et al. ............ 455/414.1 |

* cited by examiner

*Primary Examiner*—Keith Ferguson
(74) *Attorney, Agent, or Firm*—Leonard C. Suchyta, Esq.; Joseph R. Palmieri, Esq.; Finnegan, Henderson, Farabow et al.

(57) ABSTRACT

A method, apparatus, and article of manufacture for synchronizing the memory of a wireless telephone with a networked computer over a wireless link. A communication network in accordance with the present invention, includes a plurality of portable wireless telephones; a plurality of base stations; and at least one controller coupled to the Internet. The portable wireless telephone is adapted to operate a program that stores information locally and automatically synchronizes the local memory with a host computer on the Internet. In operation, when a wireless telephone user receives a telephone call or data from the Internet, the number or the information is stored in the telephone memory and then automatically stored on a computer coupled to the Internet. In another embodiment, a computer coupled to the Internet is adapted to automatically synchronize a portion of the information stored in its memory with that of a portable wireless telephone. The Internet computer may in effect be used to reconstitute the wireless telephone memory.

33 Claims, 11 Drawing Sheets

| Customer/Transponder ID Number (370) | IP Address For Corresponding Computer (380) | Contact Database (390) | | |
|---|---|---|---|---|
| | | Name 1 | Number 1 | |
| | | Name 2 | Number 2 | |
| | | Name 3 | Number 3 | |
| | | Name 4 | Number 4 | |
| | | Name 5 | Number 5 | |

SEAMLESS WIRELESS PHONE ACCESS SERVICE

FIELD OF THE INVENTION

The present invention relates generally to electronic devices and more specifically to a system and method for providing automatic synchronization of a wireless telephone with a remote computer.

DESCRIPTION OF THE RELATED ART

The advent of wireless personal communications devices has revolutionized the telecommunications industry. Cellular, PCS and other services provide wireless personal communications to businesses and individuals at home, in the office, on the road, and virtually anywhere the wireless network reaches. Wireless telephone subscribers no longer have to stop at pay telephones along the road, or wait until they return home or to the office to check messages and return important business calls. Instead, wireless subscribers carry out their day to day business in their cars, in restaurants, while walking in the airport, and just about anywhere their wireless telephone signals are accessible. Thus, it is no surprise that since the introduction of the cellular telephone service, the number of wireless telephone subscribers has increased steadily. Today, the number of wireless telephone subscribers is staggering and still growing rapidly. In fact, many households have multiple wireless telephones in addition to their conventional land-line services.

With a market of this size, there is fierce competition among hardware manufacturers and service providers. In fact, to lure customers, most providers offer handsets with desirable features or attributes such as small size, light weight, longer battery life, speed dial, and so forth. Many recent additions to the marketplace include multi-functional handsets that even provide pocket-organizer functions integrated into the wireless handset. Most manufacturers, however, are still scrambling to add new features to their communication devices in an attempt to snare a portion of this booming market.

Manufacturers and service providers are integrating wireless devices with the Internet. In particular, they seek to provide a service that allows wireless users to access contact and schedule information over a web connection from a wireless telephone. For example, the My VZW (Verizon Wireless) portal allows a user to access synchronization software to link programs like Microsoft Outlook and the Internet so that information can be transmitted between a Web account and a computer desktop. Unfortunately, these conventional systems provide limited functionality to wireless users because they offer increased access to information, but not automatic storage of that information on the wireless telephone. In essence, a user must manually store this information in the telephone's memory for convenient and constant access to the information. Consequently, there is a need for a synchronization capability that allows a wireless telephone user to automatically synchronize data files between the wireless telephone and a networked client or server computer. There is also a need for a synchronization capability that allows a user to directly download information from a networked client or server computer to a wireless telephone. There is an additional need for a synchronization capability that allows a user to simultaneously synchronize data files and conduct voice communications with another wireless telephone.

SUMMARY OF THE INVENTION

The present invention satisfies the above-described needs by providing a system and method for providing automatic synchronization of a wireless device with a host computer over a wireless network. More specifically, in one embodiment, a system and method consistent with the present invention synchronizes a wireless device having personal organizer and directory functionality with a host computer having the same or similar functionality over a wireless network.

According to one aspect of the invention, connection of a wireless telephone with a wireless Web interface enables automatic synchronization of the telephone with a host computer. According to another aspect of the invention, connection of the wireless telephone to a wireless network can automatically launch the appropriate application on the host computer. As such, intervention-free synchronization can seamlessly occur when a user accesses a wireless communication network to make a telephone call.

In another aspect of the invention, connection of the wireless telephone to a wireless Web interface automatically occurs when a user enters data into the telephone's memory.

In yet another aspect of the invention, intervention-free synchronization can simultaneously occur during conventional voice communications. During a call the telephone synchronized data with the wireless web interface, for example, using a portion of the bandwidth used for the call or a portion of bandwidth reserved for the synchronization.

It is to be understood that both the foregoing general description and the following detailed description are exemplary and explanatory and are intended to provide further explanation of the invention as claimed.

BRIEF DESCRIPTION OF THE DRAWINGS

Additional features and advantages of the invention will be set forth in the description which follows, and in part will be apparent from the description, or may be learned by practice of the invention. Advantages of the invention will be realized and attained by the methods, systems, and apparatus particularly pointed out in the written description and claims hereof, as well as the accompanying drawings.

In the drawings:

FIG. 5 is a diagrammatic representation of a typical record of a subscriber database in accordance with the present invention;

DETAILED DESCRIPTION

Figure 1:
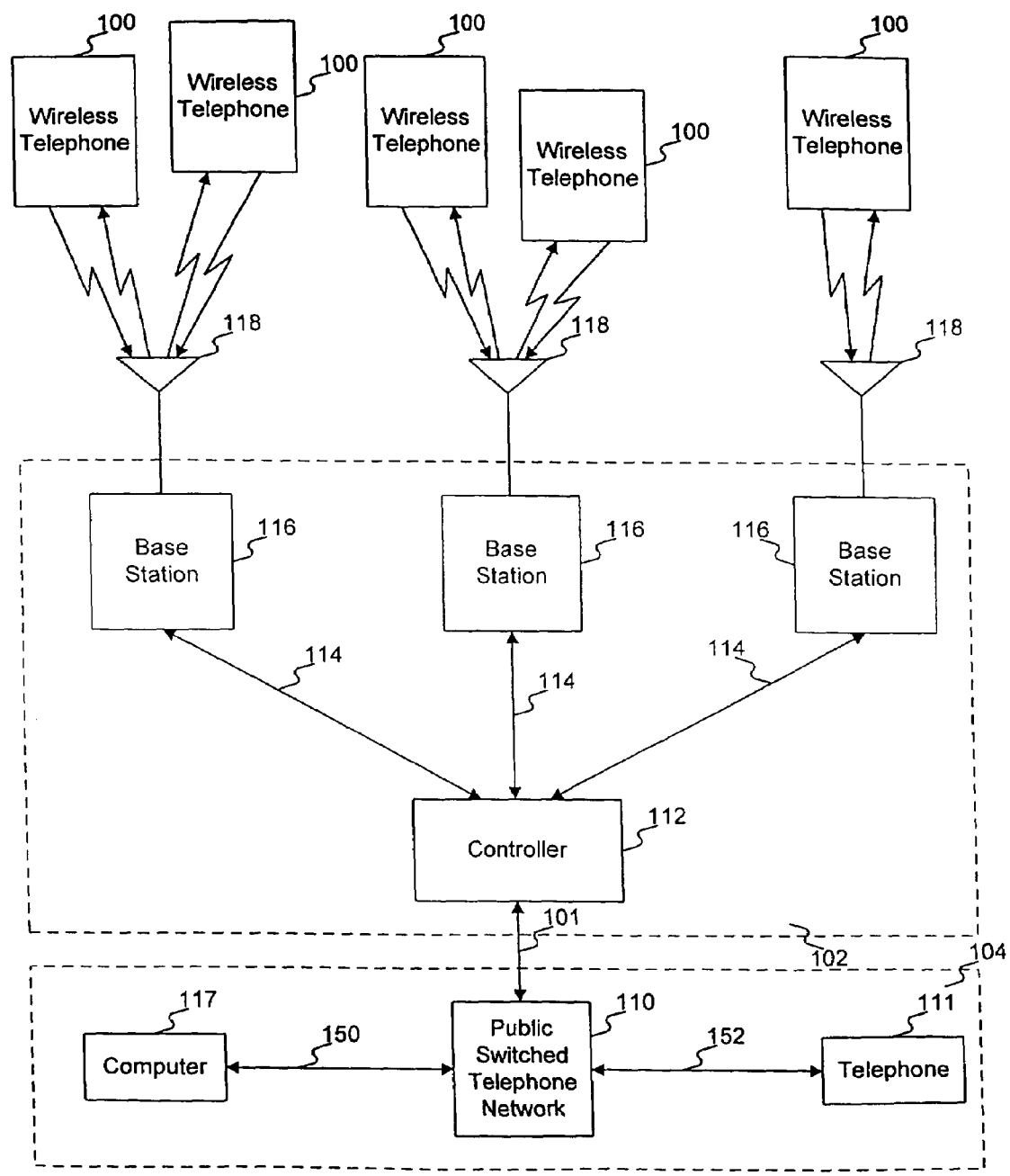
FIG. 1 is a diagram illustrating a communication network in accordance with principles consistent with the present system.

In the following detailed description reference is made to the accompanying drawings in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

A communication network in accordance with the present invention, includes a plurality of portable wireless telephones; a plurality of base stations; and at least one controller communicably connected to the Internet. Each portable wireless telephone is adapted to operate a program that stores information locally and automatically synchronizes information stored in memory of the telephone with information stored on a host computer on the Internet. In operation, when a wireless telephone user receives a telephone call, the number is stored in the telephone memory and then automatically stored on a computer coupled to the Internet. The user may associate other information with the number as well. In another embodiment, a computer coupled to the Internet is adapted to automatically synchronize a portion of the information stored in its memory with that of a portable wireless telephone. The computer may in effect be used to reconstitute the wireless telephone memory under certain circumstances as when the contents of a wireless telephone memory become corrupted or erased.

Turning to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU and the maintenance of these bits within data structures reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this designation, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer. Although a particular sequence of computer-executed steps may be discussed herein, other sequences of these steps may be performed within the scope of the invention.

It should also be understood that manipulations within the computer are often referred to in terms such as adding, comparing, moving, etc. which are often associated with manual operations performed by a human operator. It should be understood that no such involvement of a human operator is necessary or, in some instances, even desirable in the present invention. The operations described herein are machine operations performed in conjunction with a human operator or user who interacts with the computer. The machines used for performing the operation of the present invention include general purpose digital computers or other similar computing devices. Some aspects of this operation may be performed manually by or with the assistance of a human.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct a specialized apparatus to perform the method steps described herein by way of dedicated computer systems with hard-wired logic or programs stored in nonvolatile memory, such as read only memory.

The operating environment in which the present invention is used encompasses general distributed computing systems wherein general purpose computers, work stations, or personal computers are connected via communication links of various types. In a client server arrangement, programs and data, many in the form of objects, are made available by various members of the system.

Referring now to the drawings, in which like numerals represent like elements throughout the several figures, the present invention will be described.

Referring to FIG. 1, an exemplary communication network system 10 in which the present invention may be implemented is disclosed. System 10 is comprised of a plurality of wireless telephones 100, a wireless sub-network 102, a network interface 101, and a computer network 104. Wireless sub-network 102 is further comprised of a plurality of base stations 116 and a controller 112. Computer network 104 is further comprised of a Public Switched Telephone Network (PSTN) 110, a plurality of telephones represented by telephone 111, and a plurality of computers represented by computer 117. While not shown, it is understood that computer 117 could also represent the Internet). Network system 10 may have other components/configurations, but these are not shown to facilitate description of the unique aspects of this embodiment of the invention. It should be noted that the present invention may be employed in a distributed computer system environment which has internal, external and intranet networks collectively represented in our schematic overview by the Internet to connect wireless telephones 100 to World Wide Web servers and other servers within the system in which our invention is situated.

As disclosed in further detail below, wireless sub-network 102 is adapted to provide voice and data communication with each wireless telephone 100. Wireless sub-network 102 also interfaces with wireless telephones 100 and computer network 104 to further provide data synchronization with wireless telephones 100. Base stations 116 preferably communicate with wireless telephones 100 utilizing conventional radio frequency (RF) techniques. Base stations 116 are coupled by conventional communication links 114 to the controller 112, which in turn, controls the base stations 116. Controller 112 communicates with computer network 104 via interface 101 with PSTN 110. To achieve the desired handover functionality required in wireless networks and contemplated by this invention, base stations 116, each communicate with a corresponding controller 112. The various components of network 10 will now be described in more detail. As disclosed in further detail below, network 104 connects telephone and computers to controller 112. Some of the computers are servers and other are clients. Typically, the server provides data and software that is accessible to various clients which are in communication with the servers, either directly or through a device such as a router. The construction, maintenance, and operation of the servers, routers and client is known to those skilled in the art. In particular, however, the server will be configured to provide data that is compatible with browser software such as that used to view data on the World Wide Web. The data provided by the server will be in the form of pages of data that can be examined using typical browser software.

Figure 2:
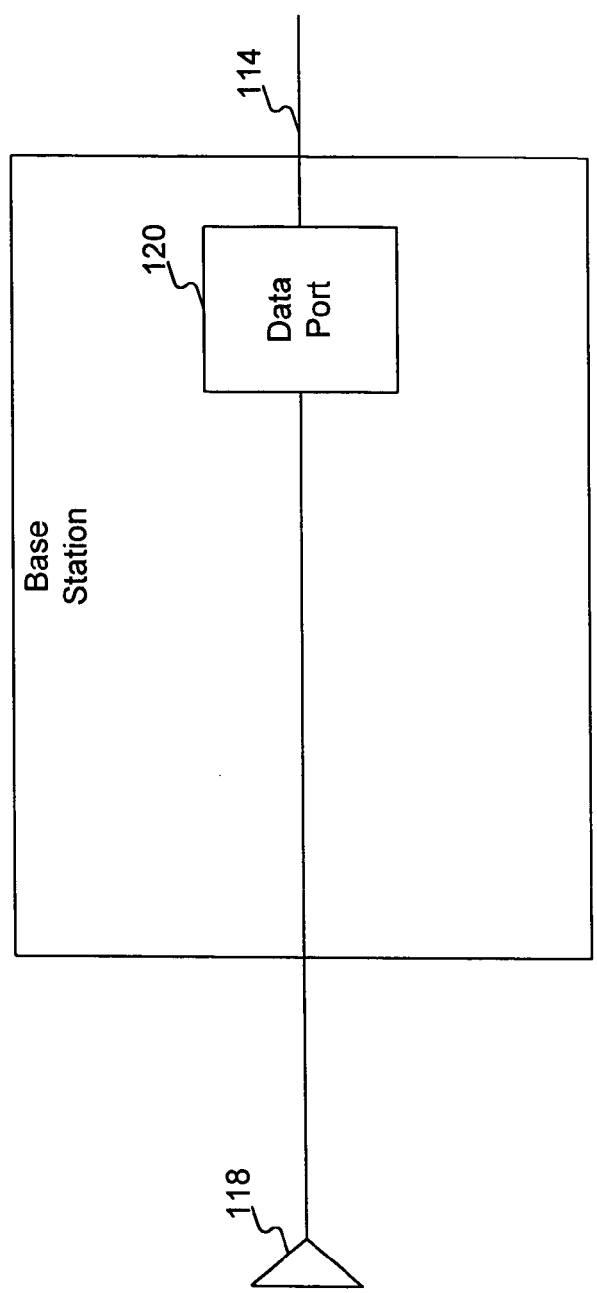
FIG. 2 is a diagram illustrating components of a base station in accordance with the present invention.

Base station 116, as shown in FIG. 1, is shown in more detail in FIG. 2. Base station 116 is comprised of an antenna 118 and a data port 120. RF signals transmitted by wireless telephones 100 are received by base station 116 via antenna 118 and then transmitted to a corresponding controller 112 via data port 120. Base station 116 is also adapted to receive signals from controller 112 via data port 120 and to transmit them to an in-range wireless telephone 100 via antenna 118. Base station 116 may have other components, as well, but these are not shown to facilitate description of the unique aspects of this embodiment of the invention. The hardware arrangement of this device, as well as other components discussed in this specification is intentionally shown as general, and is meant to represent a broad variety of architectures, which depend on the particular device used. Base station 116 can further be used to exchange or share data with a computer coupled to computer network 104. For example, a wireless telephone user may wish to upload information from wireless telephone 100 to computer 117. A user at computer 117 may correspondingly, download information from computer 117 to wireless telephone 100.

In operation, information is routed from computer 117 to PSTN 110 and controller 112 before arriving at base station 116 for transmission to wireless telephone 100. When data are uploaded from wireless telephone 100 to computer 117, the information travels from wireless telephone 100 to base station 116 to controller 112, to PSTN interface 110 and then onto computer 117.

Wireless telephones 100 such as those that would benefit from the various features and aspects of the present invention, can be implemented in a number of different configurations with a number of different architectures. In fact, as will become apparent to one of ordinary skill in the art after reading this description, implementation of the features of the present invention is not dependent on a particular or specific architecture of the wireless telephone 100 or communication device. With this in mind, a non-limiting example of a wireless telephone 100 is described in more detail with reference to FIG. 3.

Figure 3:
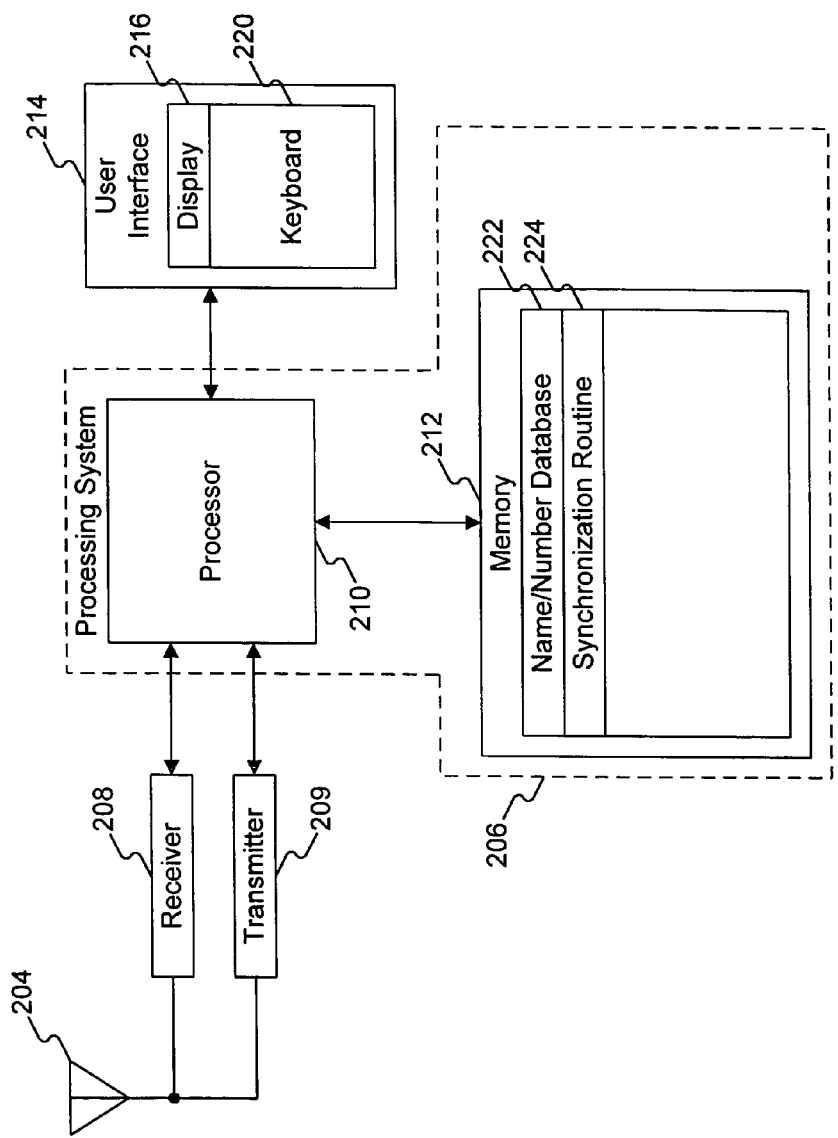
FIG. 3 is a diagram illustrating components of an exemplary wireless telephone in accordance with the present invention.

As shown in FIG. 3, wireless telephone 100 comprises an antenna 204 for intercepting an outbound message (from sub-network 102) and for transmitting an inbound message (to sub-network 102). The antenna 204 is coupled to a receiver 208 for receiving the outbound message and is coupled to a transmitter 209 for transmitting the inbound message, although receiver 208 and transmitter 209 may be integrated into a single transcriber. The receiver 208 and transmitter 209 are coupled to a processing system 206 for processing the outbound and inbound messages and for controlling the wireless telephone 100 in accordance with the present invention. A user interface 214 preferably is also coupled to the processing system 206 for interfacing with a user. The user interface 214 comprises an input device, such as a keyboard 220 outputting for entering commands and information into the wireless telephone 100 and a display 216 for messages and other information to a user. The processing system 206 comprises a conventional processor 210 and a conventional memory 212. The memory 212 comprises software elements and data for programming the processing system 206 in accordance with the present invention. The memory 212 preferably includes a database for storing names and telephone numbers 222 and a synchronization routine 224. There may be other components as well, but these are not shown to facilitate description of the unique aspects of this embodiment of the invention. The hardware arrangement of this device, as well as the other components discussed in this specification is intentionally shown as general, and is meant to represent a broad variety of architectures, which depend on the particular device used.

Figure 4:
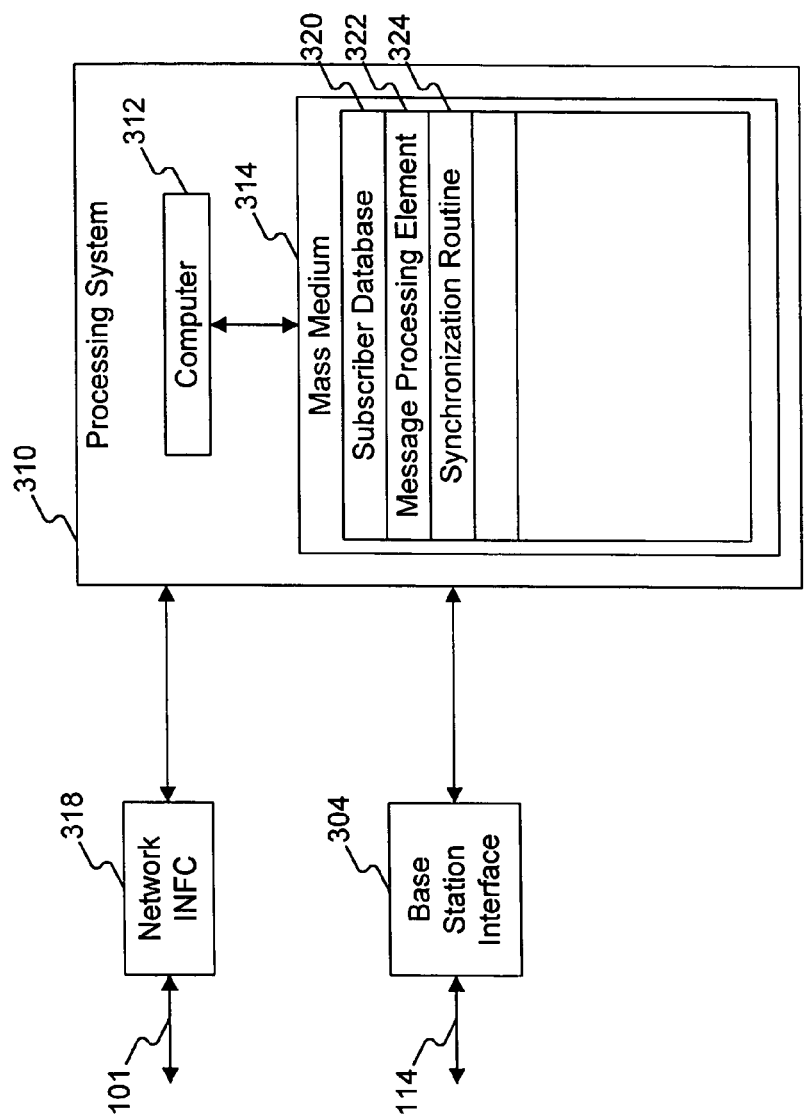
FIG. 4 is a diagram illustrating components of an exemplary controller in accordance with the present invention.

FIG. 4 is a more detailed electrical block diagram depicting an exemplary controller 112 in accordance with the present invention. Controller 112 comprises a network interface 318 for receiving a message from computer network 104 via network interface 101. Network interface 318 is coupled to a processing system 310 for controlling and communicating with the network interface 318. Processing system 310 is coupled to a base station interface 304 for controlling and communicating with the base stations 116 via communication links 114. Processing system 310 further comprises a computer 312 and a mass medium 314, e.g., a magnetic disk drive, programmed with information and operating software in accordance with the present invention. The mass medium 314 comprises a subscriber database 320 for storing profiles defining service for subscribers using the system. Mass medium 314 also includes a message processing element 322, and a synchronization routine 324 similar to synchronization routine 224 (FIG. 3) associated with wireless telephone 100. Message processing element 322 permits controller 112 to process messages between a plurality of wireless telephones 100 and between computer network 104 and wireless telephones 100.

FIG. 5 is a diagrammatic representation of the structure of a typical record 350 of subscriber database 320. Each record 350 is comprised of a unique customer/transponder ID number 370, an Internet Protocol (IP) address 380 corresponding to a computer 117, and a plurality of contact names/numbers 390. While record 350 shows five names and numbers associated with contact database 390, the number of actual entries is only limited by the size of mass medium 314. Record 350 may also include other useful information for wireless telephone users. For example, record 350 may include an address book, telephone settings (auto-answer, call screening, speaker volume, alerts, etc.), electronic planner, memos, voice mail, to do lists and other similar applications normally associated with existing personal digital assistants. Record 350 may further include other information that allows controller 112 to identify valid network users and to communicate with them.

Figure 6:
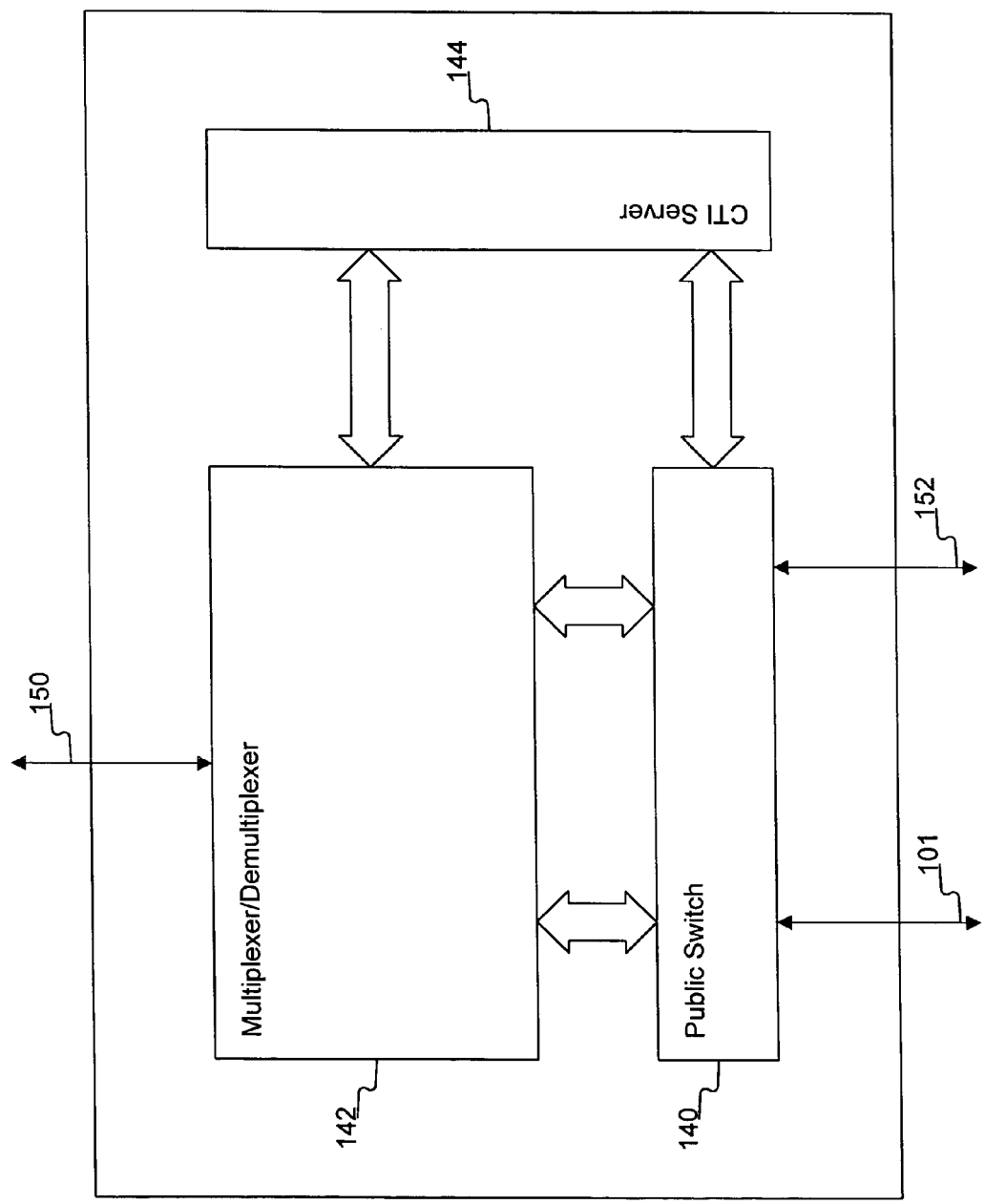
FIG. 6 is a diagram illustrating components of an exemplary public switched telephone network (PSTN) in accordance with the present invention.

PSTN 110 as shown in FIG. 1, is depicted in more detail with respect to FIG. 6. PSTN 110 is comprised of a switch 140, a multiplexer/demultiplexer 142 and a computer telephony interface (CTI) server 144. Public switch 140 contains circuits that can provide switching and call distribution functions. Public switch 140 is coupled by high bandwidth lines to multiplexer/demultiplexer 142 and CTI server 144 so that a plurality of data channels are available for connecting to wireless telephones 100, digital telephones 111 and computers 117. CTI server 144 acts as a bridge between computer network 104 and sub-network 102. CTI server 144 contains a database for storing all relevant activities of network system 10 (e.g., the current status and history of calls in network system 10 and the status and history of data synchronizations in network system 10). Multiplexer/demultiplexer 142 allows a wireless telephone user 100 to communicate with other telephone users interspersed with the information received over computer network 104. It allows multiplexing of voice, data, video or other information using ATM or IP with RSVP protocols. This results in the ability to merge the PSTN with packet switch technology in a manner controlled by the wireless telephone user.

Figure 7:
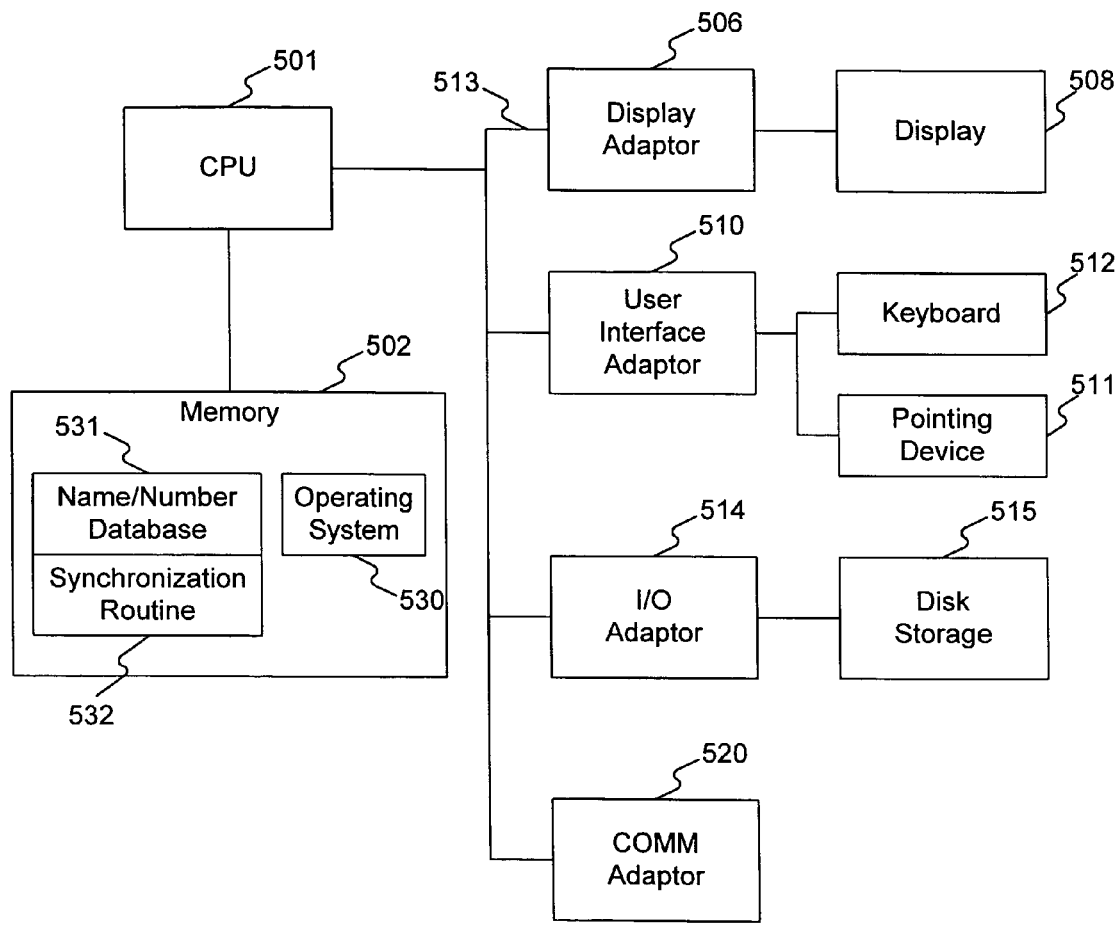
FIG. 7 is a diagram illustrating components of a networked computer in accordance with the present invention.

FIG. 7 shows a detailed block diagram of a computer 117 that may be coupled with computer network 104. Computer 117 as shown in FIG. 7 is comprised of a central processor unit (CPU) 501, a memory 502, a display adapter 506, a display 508, a user interface (UI) adapter 510, a pointing device 511, a keyboard 512, an input/output (IO) adapter 514, a disk storage unit 515, and a communications adapter 520 for providing a communications function. Memory 502 includes an operating system 530 for operating the device, a name/number database 531 and a synchronization routine 532. Database 531 and synchronization routine 532 are similar to corresponding elements on wireless telephone 100 and controller 112. In addition, stored in memory 502 is the Internet content typically associated with networked computers that allows them to communicate with other Web-based computers. The various components of each computer 117 communicate through a system bus 513 or similar architecture. As shown in FIG. 7, display adaptor 506 is coupled to display 508, user interface adaptor 510 is coupled to pointing device 511 and keyboard 512, I/O adaptor 514 is coupled to disk storage unit 515 and communications adaptor 520 is coupled to a network interface cable for providing connectivity between computer 117 and PSTN interface 110. In one embodiment, each computer 117 includes a personal computer. In another embodiment, computer 117 may be a high capacity information server.

Figure 8:
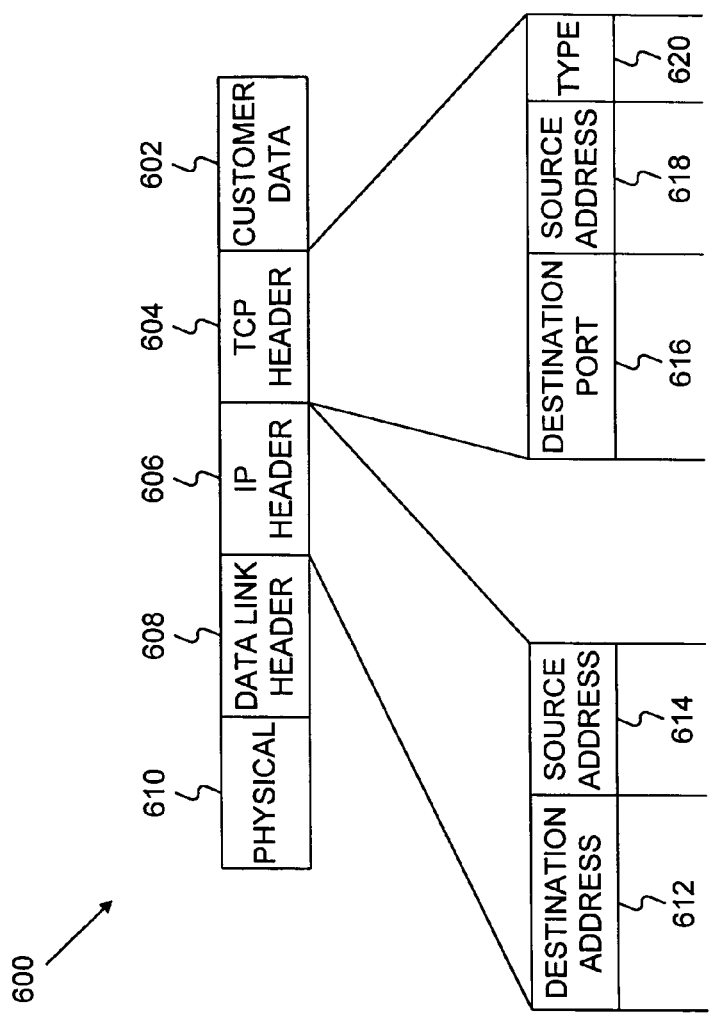
FIG. 8 is a block diagram of a data packet consistent with the present invention.

FIG. 8 shows the structure of a typical data packet 600 that is transmitted over network 10. User datagram protocol/Internet protocol (UDP/IP) and transmission control protocol/Internet protocol (TCP/IP) packet transport mechanisms provide efficient data transportation, whereby the transmission of digital network data is transparent or invisible to the user. While this specification describes the system in terms of the TCP/IP protocol, it is important to realize that the present invention can function with either protocol. Each packet 600 has customer data bytes 602 encapsulated in a TCP envelope that begins with a TCP header 604, an IP envelope that begins with an IP header 606, a data link envelope that begins with a data link header 608, and a physical envelope 610. The IP header 606 contains IP destination address 612 and IP source address 614 The TCP header 604 contains TCP destination port 616, TCP source address 618 and packet-type 620.

Under the TCP/IP protocol, and other connection oriented protocols, a device on computer network 104 wishing to transmit data to computers 117 and wireless telephones 100, begins communication by sending a packet 600 to PSTN 110. Packet 600 has the identifier of a destination on network 10 in its TCP destination port field 616. A device on network 104 attempting to communicate with a wireless telephone 100, responds with a SYN (synchronize) packet to establish a connection. Subsequent packets may then be sent back and forth freely through PSTN 110. PSTN 110 may include a comparator executing in CTI server 144 which determines whether a packet's data link header type 620 is in a protocol table containing a pre-stored list of protocols (e.g., TCP/IP) valid for use on network 10. A second comparator may determine whether the packet's IP destination address 612 and, in some cases, the TCP destination port 616 are in a destination address table containing a pre-stored list of addresses valid for network 10. If a packet has the correct protocol and has acceptable destination and source addresses, PSTN 110 allows it to pass to network 10.

When a wireless telephone user stores names and telephone numbers in memory 212 in wireless telephone 100, it may be desirable for the user to synchronize his or her contact information in the wireless telephone 100 with his or her contact information stored in memory 502 on computer 117. Synchronizing routines 324 and 532 are included on controller 112 and computer 117, respectively, for synchronization of the data files 222 with data files 320 and 531, respectively. A corresponding synchronizing routine 224 is included on wireless telephone 100.

It will be appreciated that the above-described synchronization routines may be combined into one routine and stored on a single computer. By downloading the routine using systems and methods well known in the art, users can access the synchronization software from a remote server and operate that software as if it were always installed on their local computer platform. It will also be appreciated that the present invention provides a way of storing and downloading software that allows users to execute software without having that software installed on their local machines, having access to that software only for those periods of time which the user requires the services of that software thus avoiding the need to redundantly store identical software programs on several locations on the same network.

In one embodiment, synchronization between data files 222 and 531 takes place after each use of wireless telephone 100. In another embodiment, synchronization between data files 222 and 531 takes place after each update or change to either data files. For instance, name/number database 222 on wireless telephone 100 may update name/number database 531 upon completion of a memory update on wireless telephone 100. Thus, as data is changed in either data file 222, 320, or 531, the same changes are mirrored in the other data files. This 'incremental' synchronization minimizes the amount of data transfer necessary between data files 222 and 531 at any one time. To minimize network communication activity, this automatic synchronization may take place after a predetermined number of changes to either data file 222, 320 or 531, after a predetermined number of minutes of activity, and/or upon termination of network communication activity.

Alternatively, larger amounts of data in the data files 222 and 531 can be synchronized using an "on-demand" selection over communication network 10. In this way, computer 117 and wireless telephone 100 can operate independently of one another and synchronize data files/information 531 and 222 upon the push of a 'synchronize' button on keyboards 220 or 512, through speech command using voice recognition into user interface 214, or other operator selection similar to the conventional 'hot synchronize' button on current Personal Data Assistants (PDAs).

Using the incremental synchronization capability or the 'on-demand' synchronization provides conveniences not found in conventional wireless telephones. The wireless synchronization feature allows a user to initiate the synchronization routine 224 and synchronize data files 222, 320 and 531 at any time without the need to hook-up to a telephone jack or to co-locate wireless telephone 100 with the controller 112 and computer 117.

Figure 9:
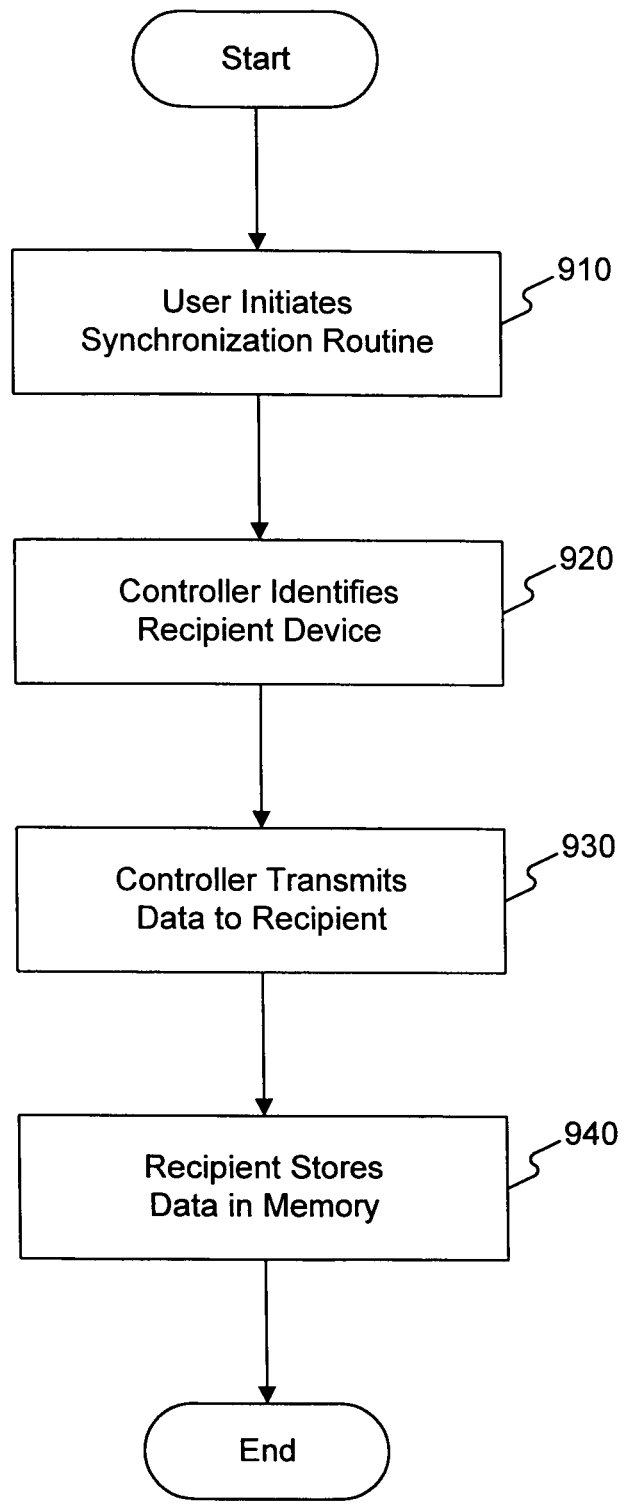
FIG. 9 is a detailed flow chart depicting the steps performed in accordance with the present invention when it performs an "on demand" synchronization.

Referring now to FIG. 9, a detailed flow diagram is shown that describes the process of performing an "on-demand" synchronization. As shown in step 910, a user at computer 117 initiates synchronization routine 532 via keyboard 512. Synchronization routine 532 bundles data that has been recently updated in database 531 and then transmits the data to controller 112. Upon receiving the data, controller 112 in step 920, accesses subscriber database 320 and identifies the recipient wireless telephone 100. Once the appropriate wireless telephone 100 has been identified, controller 112 (step 930) transmits the bundled data to wireless telephone 100 for storage in memory 212 (step 940). While FIG. 9 depicts the 'on demand' synchronization process as occurring from computer 117 to wireless telephone 100, it is important to understand that the process may occur from wireless telephone 100 to computer 117.

The previously described synchronization process may be performed before, during and after a telephone call on wireless telephone 100. The next portion of this specification describes the process performed by PSTN 110 to handle scheduling of data and voice communications to/from wireless telephones 100 and computers 117.

Figure 10:
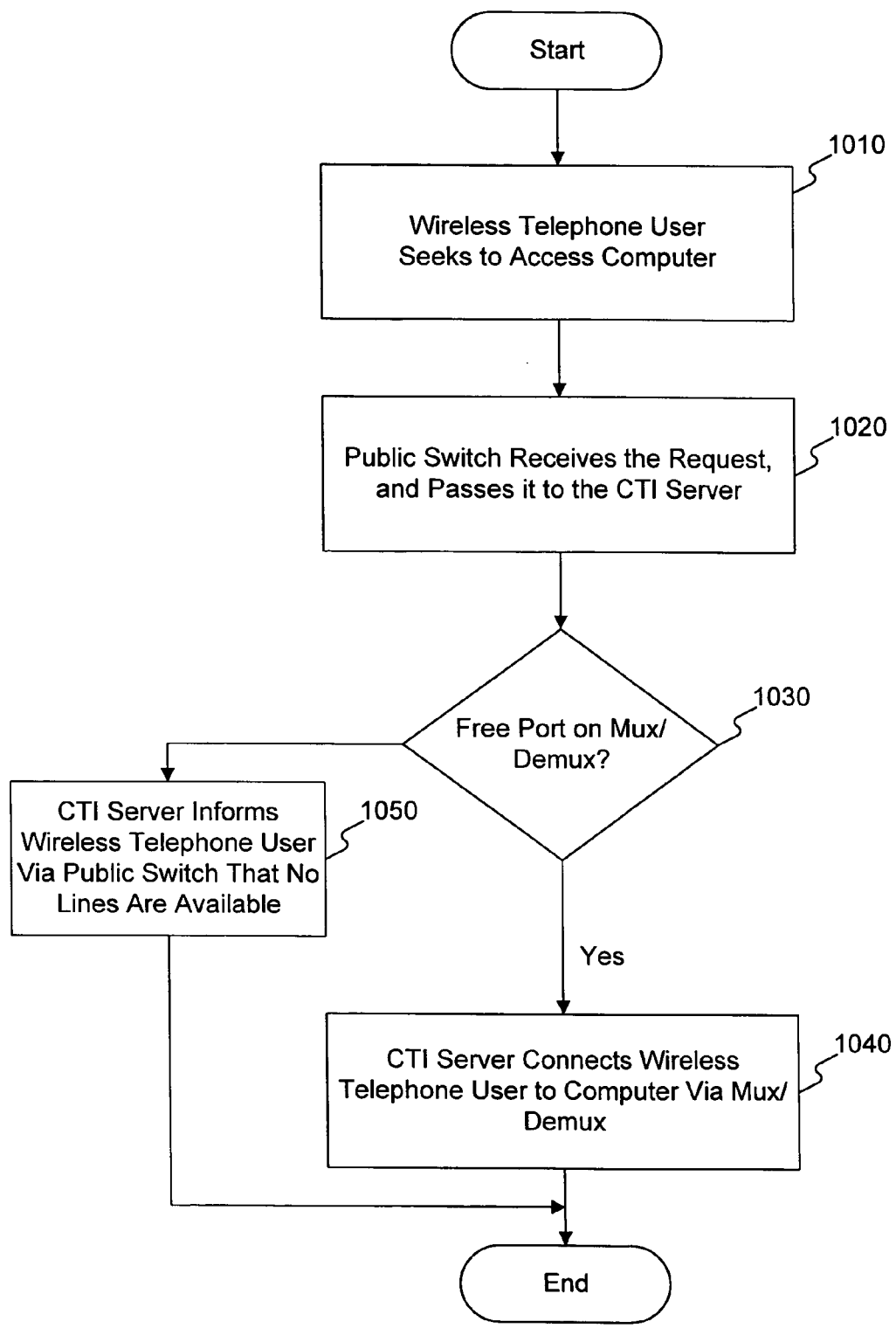
FIG. 10 is a detailed flow chart depicting the steps performed in accordance with the present invention when a user of a wireless telephone attempts to access a computer on the computer network.

FIG. 10 shows a detailed flow diagram of the process performed when a user of a wireless telephone 100 dials a number for a computer 117 on network 104. As shown in step 1010, when a user initiates an access request (dials the number to a network interface corresponding to computer 117, or speaks command into user interface 214), the request is transmitted to public switch 140. In step 1020, public switch 140 issues a request to CTI server 144 requesting that the CTI server 144 provide the public switch with instructions as to what to do with the dialing request. CTI server 144 determines whether there are any available ports on the multiplexer/demultiplexer 142 (step 1030). (Note, there can be a dialog between the CTI server 144 and the multiplexer/demultiplexer 142 to determine the appropriate terminating port and associated telephone number). If there are available ports (step 1040), CTI server 144 instructs the switch 140 to redirect the call to a telephone number representing a free port on multiplexer/demultiplexer 142. The multiplexer/demultiplexer 142 will then establish the path to computer 117 and information will flow freely between wireless telephone 100 and the computer 117. If there are no lines available, CTI server 144 (in step informs wireless telephone 100 via public switch 140 that no lines are available, and processing terminates. CTI server 144 may alternatively retry the request a predetermined number of times after a predetermined delay period.

Figure 11:
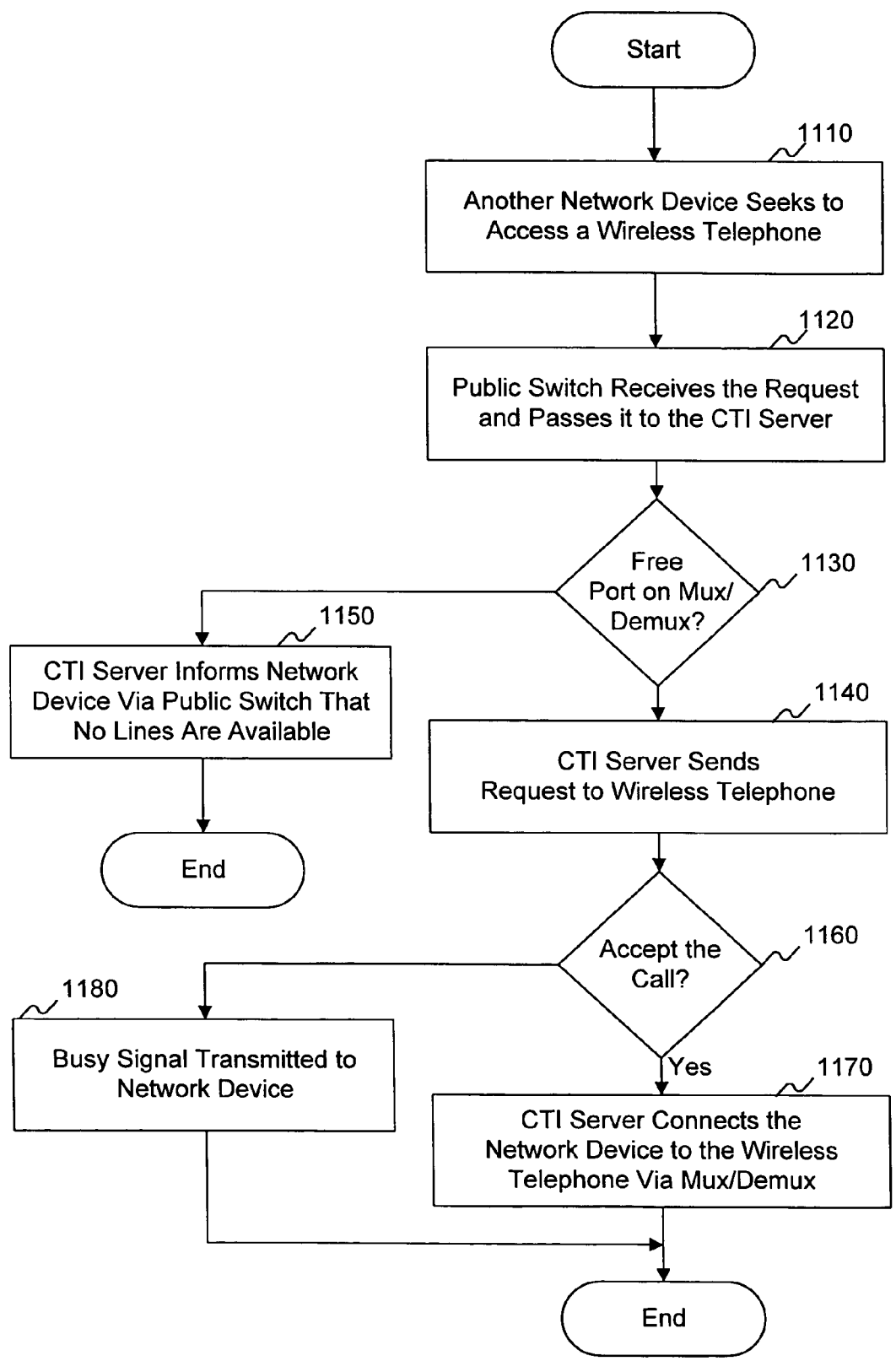
FIG. 11 is a detailed flow chart depicting the steps performed in accordance with the present invention when a user at another network device on a computer network attempts to access a wireless telephone.

Referring now to FIG. 11, there is shown a detailed flow diagram of the process performed when a user at another network device on computer network 104 (telephone or computer) dials the telephone number of a wireless telephone that is already connected to another user over a voice communication link. As shown in FIG. 11, steps 1110–1130 correspond to steps 1010–1030 in FIG. 10. If there is not an available port on the multiplexer/demultiplexer 142 (step 1130), the CTI server 144 transmits a busy signal back to the other network device (step 1150). If there is an available port, CTI server 144 sends a request through multiplexer/demultiplexer 142, over the link 101, to wireless telephone 100 for instructions as to what to do with this call along with information as to who is calling (1140). The end user's choice of what to do with the call is forwarded from the wireless telephone 100 across link 101 to the CTI server 144. If the choice is to accept the call (step 1160), the CTI server 144 instructs public switch 140 to redirect the call to a specific telephone number or port id on the multiplexer/demultiplexer 142 that will terminate the call from the first user.

At this point, either the multiplexer/demultiplexer 142 or the CTI server 144 will answer the call on behalf of wireless telephone 100. (step 1170) (Note, there can be a dialog between the CTI server 144 and the multiplexer/demultiplexer 142 to determine the appropriate terminating port and associated telephone number). The multiplexer/demultiplexer 142 will begin multiplexing the voice over the voice channel together with data on the data channel, and the computer user can begin transmitting data to wireless telephone 100, while the caller simultaneously continues to communicate with the user of the wireless telephone 100 over the voice channel. and 1050. If the end user decides not to accept the call (step 1160), CTI server 144 passes a busy signal back to the other network device (step 1180) and processing terminates. The above embodiment can, using the same methodology, be extended to handle additional incoming and outgoing calls. This is done by multiplexing additional telephone numbers associated with the requesting computer's telephone number.

From the foregoing description, it will be appreciated that the present invention provides an efficient system and method for minimizing traffic on a wireless backbone network. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; or other forms of RAM or ROM. Similarly, the method of the present invention may conveniently be implemented in program modules that are based upon the flow chart in FIG. 9. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. A wireless telephone comprising:
   a voice communication module for establishing a voice communication link between the wireless telephone and a second telephone; and
   a memory, comprising:
      a synchronization routine, wherein the synchronization routine is downloaded from a remote server if the synchronization routine is not present in the wireless telephone; and
      a database;
      said synchronization routine being adapted to automatically transmit information reflecting a database change to a computer over a wireless network while the voice communication link is established.

2. The wireless telephone of claim 1, wherein said transmission of the information occurs after said synchronization routine identifies a difference between said database and a database on the computer.

3. The wireless telephone of claim 1, wherein said transmission of the information occurs after a predetermined period of time.

4. The wireless telephone of claim 1, wherein said transmission of the information occurs after said synchronization routine identifies a predetermined number of differences between said database and a database on the computer.

5. The wireless telephone of claim 1, wherein said database comprises a plurality of names and associated telephone numbers and other information.

6. A computer-implemented method for synchronizing a data file of a wireless telephone with a data file of a computer over a wireless network, the method comprising:
   storing a synchronization routine in a memory of the wireless telephone;
   establishing a voice communication link between the wireless telephone and a second telephone;
   monitoring a change to the data file of the wireless;
   initiating the synchronization routine to transmit the change to the computer over the wireless; and
   receiving the change by the computer,
   wherein the voice communication link remains established during the monitoring, the initiating, and the receiving.

7. The method of claim 6, wherein the monitoring step further comprises comparing the data file of the wireless telephone with a data file stored on a controller on the wireless network.

8. The method of claim 6, wherein the initiating step further comprises:
   transmitting data file changes from the wireless telephone to a controller on the wireless network;
   updating a data file on the controller to reflect the changes from the wireless telephone; and
   transmitting data file changes from the controller to the computer.

9. A computer-implemented method for synchronizing a data file of a computer with a data file of a wireless telephone over a wireless network, the method comprising:
   storing a synchronization routine in memory of the computer;
   establishing a voice communication link between the wireless telephone and a second telephone;
   monitoring a change to the data file of the;
   initiating the synchronization routine located in memory of the computer to transmit data file changes from the computer to the wireless telephone over the wireless network; and
   receiving the data file changes by the wireless telephone, wherein the voice communication link remains established during the monitoring, the initiating, and the receiving.

10. The method of claim 9, wherein the monitoring step further comprises comparing the data file of the computer with a data file stored on a controller on the wireless network.

11. The method of claim 9, wherein the initiating step further comprises:
    transmitting data file changes from the computer to a controller on the wireless network;
    updating a data file on the controller to reflect the changes from the computer; and
    transmitting data file changes from the controller to the wireless telephone.

12. A system for synchronizing a data file of a wireless telephone with a data file of a computer over a wireless network, the method comprising:
    means for establishing a voice communication link between the wireless telephone and a second telephone;
    means for monitoring a change to the data file of the wireless telephone while the voice communication link remains established;
    means for initiating, while the voice communication link remains established, a synchronization routine located in memory of the wireless telephone to transmit the change to the computer over the wireless network; and
    means for receiving the change by the computer, while the voice communication link remains established.

13. The system of claim 12, wherein the means for monitoring further comprises means for comparing the data file of the wireless telephone with a data file stored on a controller on the wireless network.

14. The system of claim 12, wherein the means for initiating further comprises:
    means for transmitting data file changes from the wireless telephone to a controller on the wireless network;
    means for updating a data file on the controller to reflect the changes from the wireless telephone; and
    means for transmitting data file changes from the controller to the computer.

15. A computer-readable medium containing instructions for synchronizing a data file of a wireless telephone, the method comprising:
    establishing a voice communication link between the wireless telephone and a second telephone;
    monitoring a change to the data file of the wireless telephone;
    initiating a synchronization routine located in memory of the wireless telephone to transmit the change to the computer over the wireless network; and
    receiving the change by the computer,
    wherein the voice communication link remains established during the monitoring, the initiating, and the receiving.

16. The computer-readable medium of claim 15, wherein the monitoring step further comprises comparing the data file of the wireless telephone with a data file stored on a controller on the wireless network.

17. The computer-readable medium of claim 15, wherein the initiating step further comprises:

transmitting data file changes from the wireless telephone to a controller on the wireless network;
updating a data file on the controller to reflect the changes from the wireless telephone; and
transmitting data file changes from the controller to the computer.

18. A wireless network for synchronizing a data file of a wireless telephone with a data file of a computer, said network comprising:
a wireless telephone having a voice communication module for establishing a voice communication link between the wireless telephone and a second telephone;
a controller coupled to said wireless telephone by a wireless interface, said controller comprising a synchronizing routine, wherein the synchronization routine is downloaded from a remote server if the synchronization routine is not present in the controller; and
a computer coupled to said controller;
said synchronizing routine adapted to:
compare a controller memory to a corresponding memory of the wireless telephone while the voice communication link is established;
update the controller memory to reflect any differences resulting from the comparison while the voice communication link is established; and
transmit the changes to the computer.

19. The wireless network of claim 18, wherein said wireless telephone further comprises a synchronizing routine.

20. The wireless network of claim 19, wherein the synchronizing routine associated with the wireless telephone is adapted to:
compare a memory of the wireless telephone to a corresponding memory of the computer; and
update the wireless telephone memory to reflect the changes from the comparison.

21. The wireless network of claim 18, wherein said computer further comprises a synchronizing routine.

22. The wireless network of claim 21, wherein the synchronizing routine associated with the computer is adapted to:
compare a computer memory to a corresponding memory of a wireless telephone; and
update the memory location associated with the computer to reflect the changes from the comparison.

23. A computer-implemented method for synchronizing a data file of a wireless telephone with a data of a computer over a wireless network, the method comprising:
establishing a voice communication link between the wireless telephone and a second telephone;
initiating a synchronization routine to transmit the data file from the wireless telephone to the computer over the wireless network; and
receiving the data file by the computer,
wherein the voice communication link remains established during the initiating and the receiving.

24. The method of claim 23, wherein the initiating step further comprises:
comparing the data file of the wireless telephone with a data file stored on a controller on the wireless network and;
initiating a synchronization routine to transmit the data file from the wireless telephone to the computer over the wireless network, upon the occurrence of a predetermined event.

25. The method of claim 23, wherein the initiating step further comprises
transmitting data file changes from the wireless telephone to a controller on the wireless network; and
updating a data file on the controller to reflect the changes from the wireless telephone.

26. The method of claim 25 further comprising transmitting data file changes from the controller to the computer.

27. A computer-implemented method for synchronizing a data file of a wireless telephone with a data of a computer over a wireless network, the method comprising:
establishing a voice communication link between the wireless telephone and a second telephone;
initiating a synchronization routine to transmit the data file from the computer to the wireless telephone over the wireless network; and
receiving the data file by the wireless telephone,
wherein the voice communication link remains established during the initiating and the receiving.

28. The method of claim 27, wherein the initiating step further comprises:
comparing the data file of the wireless telephone with a data file stored on a controller on the wireless network and;
initiating a synchronization routine to transmit the data file from the wireless telephone to the computer over the wireless network, upon the occurrence of a predetermined event.

29. The method of claim 27, wherein the initiating step further comprises:
transmitting data file changes from the computer on the wireless network to the wireless telephone; and
updating the data file on the wireless telephone to reflect the changes from the computer.

30. The method of claim 27 further comprising transmitting data file changes from the computer to a controller on the wireless network.

31. A system, comprising:
a wireless telephone, comprising:
a telephone database; and
a voice communication module for establishing a voice communication link between the wireless telephone and a second telephone;
a computer, comprising:
a synchronization routine, wherein the synchronization routine is downloaded from a remote server if the synchronization routine is not present in the computer; and
a computer database; and
a wireless network interconnecting the wireless telephone to the computer;
said computer adapted to automatically invoke the synchronization routine to synchronize the telephone database with the computer database while the voice communication link is established, upon the occurrence of a predetermined event.

32. The system of claim 31, wherein said wireless telephone further comprises a synchronization routine.

33. The system of claim 32, wherein said wireless telephone is further adapted to automatically invoke the wireless telephone synchronization routine to synchronize the computer database with the wireless telephone database, upon the occurrence of a predetermined event.

* * * * *